United States Patent [19]

Miyata

[11] Patent Number: 4,669,636

[45] Date of Patent: Jun. 2, 1987

[54] DISPENSING GUN

[75] Inventor: Makoto Miyata, Hikone, Japan

[73] Assignee: Matsushita Electric Works, Ltd., Japan

[21] Appl. No.: 841,318

[22] Filed: Mar. 19, 1986

[30] Foreign Application Priority Data

Mar. 28, 1985 [JP] Japan .................................. 60-64216

[51] Int. Cl.[4] ......................... B67D 5/42; B29C 47/00

[52] U.S. Cl. .................................... 222/153; 222/327; 222/391; 285/184; 425/458

[58] Field of Search ............... 222/153, 469, 325, 326, 222/327, 391; 425/376 R, 376 B, 458; 401/176, 261, 265, 266; 285/184

[56] References Cited

U.S. PATENT DOCUMENTS

| | | | |
|---|---|---|---|
| Re. 26,180 | 4/1967 | Frenzel | 222/39 |
| 1,986,166 | 1/1935 | Schneider | 222/391 X |
| 2,116,004 | 5/1938 | Tear | 285/184 X |
| 2,176,295 | 10/1939 | Creveling | 285/184 X |

FOREIGN PATENT DOCUMENTS 649947 2/1951 United Kingdom .

*Primary Examiner*—Frank E. Werner

*Assistant Examiner*—Jay I. Alexander

*Attorney, Agent, or Firm*—Stevens, Davis, Miller & Mosher

[57] ABSTRACT

A cartridge type dispensing gun comprises a housing and a barrel in which is mounted a cartridge containing a supply of viscous material. A plunger is driven to extend from the housing into the barrel for pushing a piston at the rear end of the cartridge to force the contents thereof out of a spout formed at the front end of the cartridge. The spout is in use to be cut off at an angle of about 45° to leave an angled edge which is utilized as a spatula when applying a bead of viscous material to a surface being treated. A joint assembly connects the barrel to the housing in such a manner that the barrel together with the cartridge received therein is rotatable about its axis with respect to the latter and is locked in one of a plurality of angularly displaced positions about that axis, whereby the angled edge of the spout can be adjusted to change its angular orientation so as to be effectively utilized as a spatula depending upon differing requirements of the surface to be treated while allowing the housing to be held at a comfortable position.

2 Claims, 16 Drawing Figures

DISPENSING GUN

BACKGROUND OF THE INVENTION

1. Field of the Invention

The present invention is directed to a dispensing gun, and more particularly to a hand-held dispensing gun fitted with a cartridge for dispensing a viscous material such as caulking and sealant compounds out of the cartridge.

2. Description of the Prior Art

Dispensing guns for dispensing viscous materials out of a cartridge inserted therein have been extensively used for caulking and sealing operations, one typical example of which is disclosed in U.S. Pat. No. Re. 26,180. The prior dispensing guns generally include a housing with a hand grip, a barrel extending from the housing to receive a cartridge containing a supply of viscous material. The cartridge has its rear end wall formed by a piston which is pushed forwardly by a plunger extending from the housing to force the contents of the cartridge out of a spout at the front end thereof. To practice the caulking and sealing procedures with this cartridge type dispensing gun, it is quite common to firstly cut off the end of the spout at an angle of about 45° and then move the gun along the joint to be treated by squeezing the trigger of the gun for applying a continuous bead of viscous material by making use of the angled edge of the spout as a spatula. With this angled edge of the spout serving as the spatula, the viscous material being dispensed can be readily filled in the joint as well as a smooth finish of the bead can be obtained. However, this procedure utilizing the angled edge of the spout will certainly pose a problem where the operator is required to move the gun around as when changing the advancing direction thereof, for example, in the case of applying caulking or sealing around window and door frames. In such operation situs, the operator is forced to frequently change the manner of holding the gun or rotating the cartridge about its axis when advancing the gun vertically along the sides of the frame and horizontally along the top or bottom of the frame in order to keep the angled edge of the spout in effective contact with the surface to be treated, which compels the operator to proceed with the operation in an uncomfortable posture and sometimes requires the operator to interrupt the operation for reloading the cartridge. To avoid the above problem, it may be thought reasonable to provide the barrel receiving the cartridge freely rotatable about its axis with respect to the housing such that the cartridge can be rotated together with the barrel for adjusting the orientation of the its angled edge of the spout without shifting the grip of the gun. However, there still remains a problem in that the barrel or the cartridge might fluctuate or be rendered unstable when moving the gun around so that the angled edge of the spout would be out of effective contact with the surface to be treated. Therefore, the operator is required to constantly hold the barrel unrotated at a desired position with one hand for effectively utilizing the angled edge of the spout when moving the gun with the other hand, which is inconvenient in producing fatigue of the operator's arms and restricts the use of the gun to a limited operational site where the operator is allowed to use both hands solely for manipulating the gun, practically prohibiting one handed operation of the gun.

Consequently, it is most desirable to present a dispensing gun capable of being manipulated by one hand, yet permitting the operator to utilize the angled edge of the spout of a cartridge as a spatula for effectively applying a smoothly finished bead of the dispensed viscous material.

SUMMARY OF THE INVENTION

The present invention has been accomplished in view of the above and provides an improved dispensing gun for use with a cartridge containing a supply of viscous material to be dispensed through a spout of the cartridge. The dispensing gun in accordance with the present invention comprises a housing with a hand grip and a barrel extending from the housing for receiving therein the cartridge. A plunger in the housing is driven to push a piston forming a rear end wall of the cartridge to force the contents thereof out of a spout at the forward end of cartridge. The characterizing feature of the present invention resides in that the barrel is rotatable together with the cartridge about its axis with respect to the housing and is connected thereto by joint means which enables the barrel to be rotated about its axis with respect to the housing and which permits it to be locked at one of a plurality of angularly displaced positions about that axis. Thus, the barrel or the cartridge can be adjusted to and locked at a suitable angular position with respect to the housing so that the angled edge of the spout formed as a result of cutting off the tip thereof at an angle can be always brought into effective contact with the surface to be treated irrespective of the differing positions of the housing for applying a smooth bead of the viscous material as utilizing the angled edge as a spatula. That is, the angled edge of the spout can be adjustably changed with its orientation to follow a line along which the gun is advanced for effectively applying the bead of the viscous material while the housing is moved around with its position being held at a comfortable position, during which operation the cartridge or the barrel is locked at a proper position without the assistance of the operator's hand so that the gun may be easily manipulated with one hand, leaving the other hand of the operator free to be utilized for another purpose.

Accordingly, it is a primary object of the present invention to provide a dispensing gun which is capable of adjusting the orientation of the angled edge left at the spout of the cartridge for effectively applying a smooth bead by better utilization of the angled edge as a spatula while the gun is moved in changing directions with its position kept at a comfortable position, yet allowing the one hand operation of the gun.

Said lock means comprises a ratchet spring provided on the side of the barrel and a plurality of notches provided on the side of the housing to be circumferentially spaced about the axis of the barrel. The ratchet spring is biased into mating engagement with any one of the notches for locking the barrel at one of its angularly displaced positions, and can be out of mating engagement as the barrel is rotated with a sufficient force to resiliently deform the ratchet spring. Thus, adjusting the angular position can be made simply by rotating the barrel with respect to the housing, which is therefore another object of the present invention.

In a preferred embodiment, release means is included in said joint assembly for releasing the ratchet spring to facilitate the rotation of the barrel or cartridge in selecting the angular position thereof. The release means is manipulated by a release knob mounted on the side of the barrel so that it is readily accessible by a finger of the hand grasping the barrel for rotation thereof, whereby the operator can easily adjust the angular position of the barrel by one hand while holding the gun with the other hand.

It is therefore a further object of the present invention to provide a dispensing gun in which the barrel or the cartridge can be easily adjusted in its angular position.

These and other objects of the present invention will be more apparent from the following description of the preferred embodiments when taken in conjunction with the attached drawings.

DESCRIPTION OF THE PREFERRED EMBODIMENTS

Figure 1:
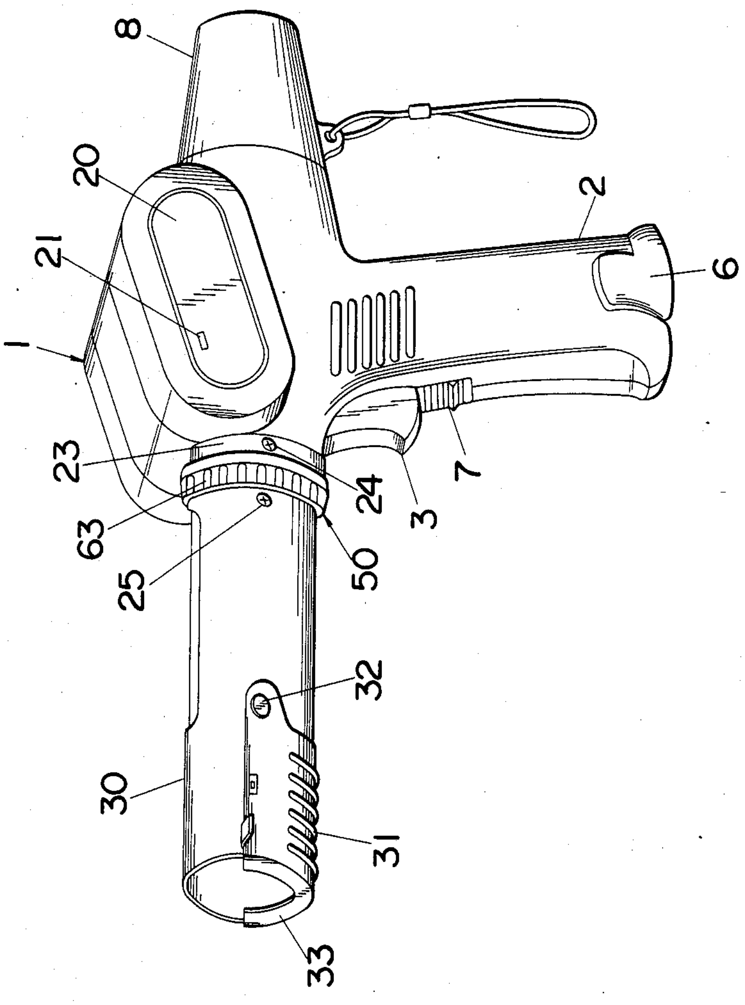
FIG. 1 is a perspective view of a dispensing gun in accordance with a first embodiment of the present invention.
Figure 2:
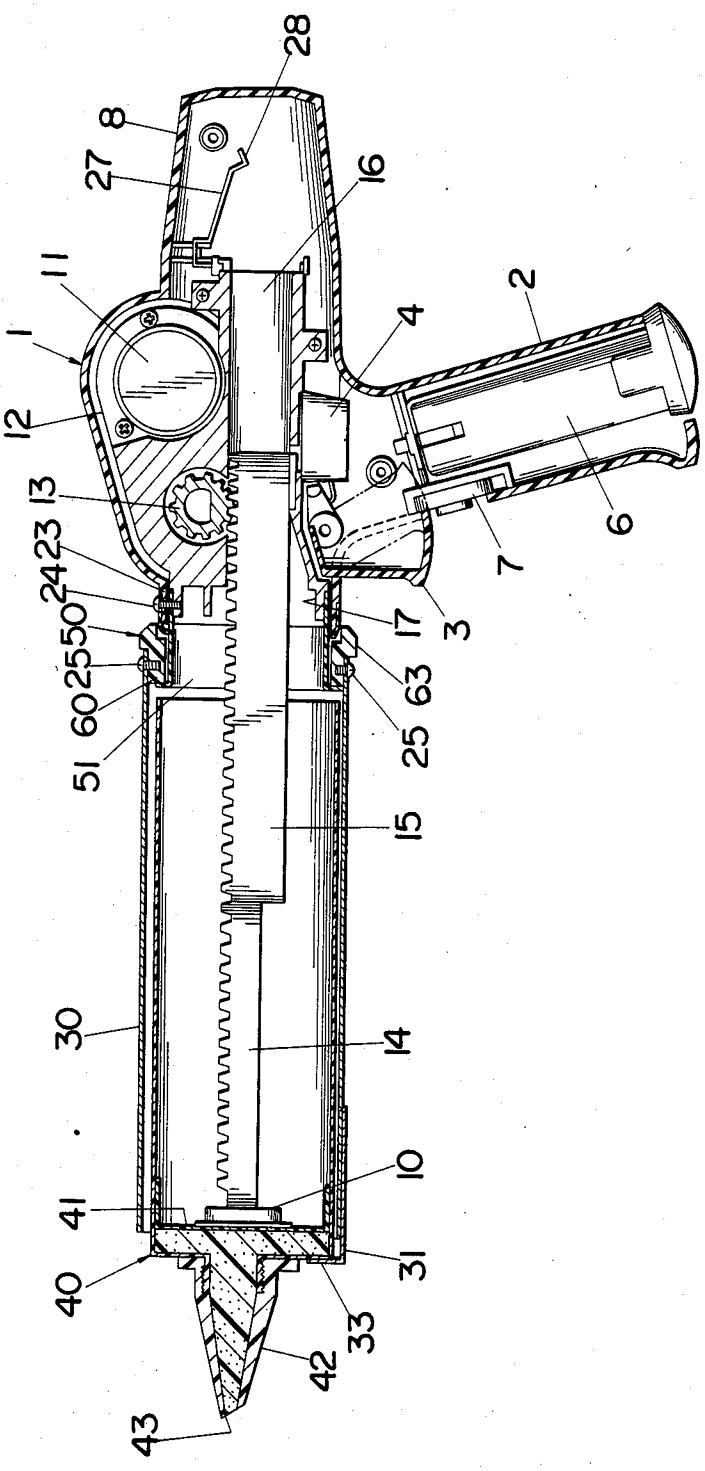
FIG. 2 is a vertical sectional view of the gun.
Figure 3:
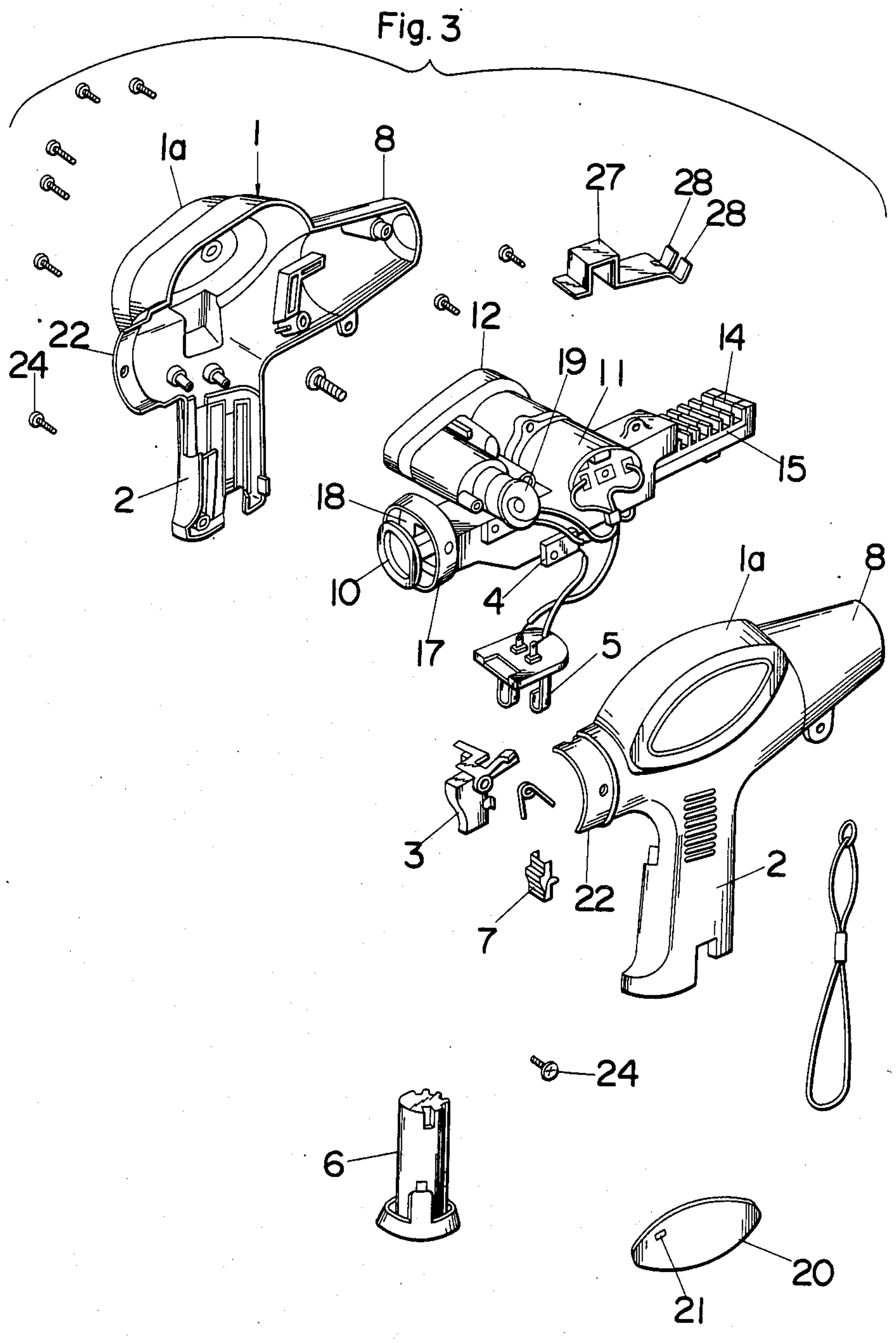
FIG. 3 is an exploded perspective view of the gun.

Referring to FIGS. 1 to 3, a dispensing gun according to a first embodiment of the present invention is shown to comprise a housing 1 with a hand grip 2, a barrel 30 extending forwardly of the housing 1 in axial alignment therewith, and a cartridge 40 containing a supply of viscous material such as caulking and sealant materials. Said hand grip 2 extends integrally and angularly from the housing 1 to present the pistol-like appearance. Mounted within a housing 1 is an electric motor 11 which is energized by squeezing a trigger 3 on the hand grip 2 to force the contents out of the cartridge 40 through a drive mechanism. The motor 11 is electrically connected by way of a switch 4 actuated by the trigger 3 and terminal members 5 to a rechargeable battery 6 detachably inserted in the hand grip 2 through the butt thereof so as to be powered thereby. The hand grip 2 is also provided with a trigger lock 7 which holds the trigger 3 in its de-energizing position upon being slid upwardly into locked engagement therewith.

The barrel 30 is in the form of a hollow cylinder with a forward end cap 31 pivoted at 32 and is connected by means of a joint assembly 50 to the housing 1 so as to be rotatable about its longitudinal axis with respect to the latter. Said cartridge 40 is of conventional type including an axially slidable piston 41 forming the rear end wall and a spout 42 coaxially projecting from the forward end. The tip of the spout 42 is in use to be cut off at a angle of about 45° leaving an angled edge 43 thereat which is utilized as a spatula during the operation of applying a bead of the viscous material. The piston 41 is pushed forwardly by a plunger 10 of said drive mechanism for dispensing the contents of the cartridge 40 out of the spout 42. The cartridge 40 is inserted in the barrel 30 through its forward end and is held between a clamp end 33 of the cap 31 and the plunger 10 to be rotatable together with the barrel 30.

Figure 4:
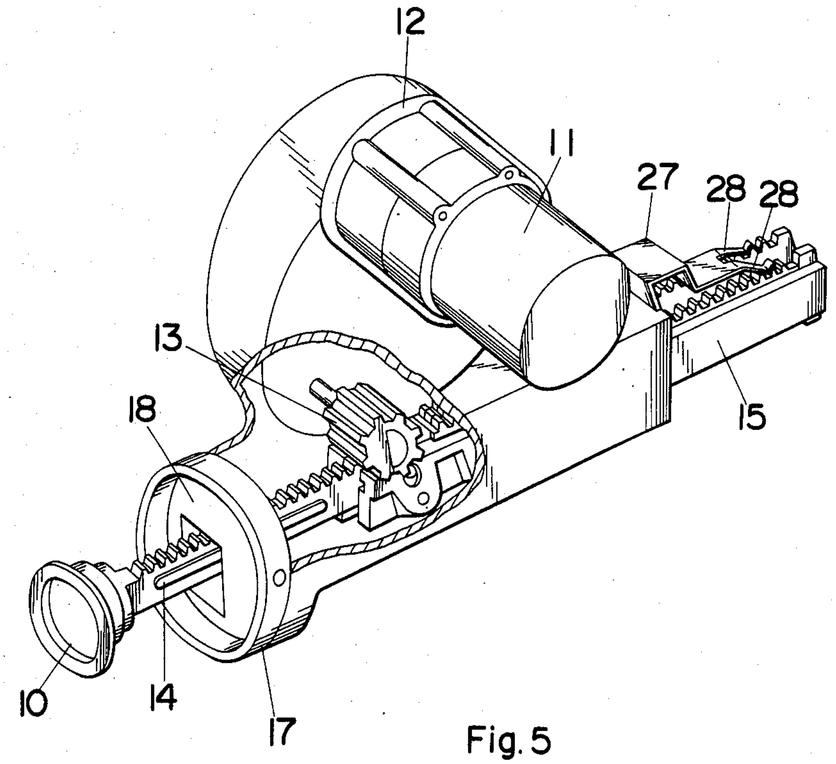
FIG. 4 is a perspective view of a drive mechanism of the dispensing gun.
Figure 5:
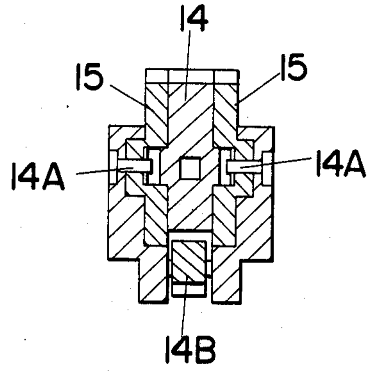
FIG. 5 is a sectional view of first and second racks employed in the above drive mechanism.
Figure 8:
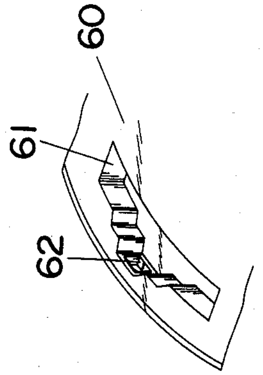
FIG. 8 is an enlarged perspective view of a portion of the joint assembly receiving a ratchet spring.

The drive mechanism includes a speed reduction gearing enclosed together with said motor 11 within a gear casing 12 for driving connection from the motor 11 to an output pinion 13, which is in meshing engagement with first and second racks 14 and 15 for forward movement thereof along axis of the barrel 30 upon energization of the motor 11. Said plunger 10 is carried at the forward end of the first rack 14 to be freely rotatable with respect to the axis thereof for ensuring pressing engagement with the piston 41 irrespective of the angular position of the barrel 30 or cartridge 40 about its axis. A lengthwise opening 16 is formed in the casing 12 in which the first and second racks 14 and 15 are slidably received to be guided thereby for axial movement. The construction and operation of the first and second racks 14 and 15 are described in detail in U.S. patent application Ser. No. 627,857 filed on July 5, 1984 now U.S. Pat. No. 4,583,934 issued Apr. 22, 1986 and U.S. Pat. No. 4,615,469 issued Oct. 7, 1986, and assigned to the same applicant of the present invention and therefore only brief explanation thereof is made hereinbelow. As shown in FIGS. 4 and 5, the first rack 14 is slidably received in the second rack 15 and is telescopically connected thereto in such a manner that the first rack 14 is initially in meshing engagement with the pinion 13 to be driven thereby to move forward extending into the barrel 30 for pushing the piston 41 of the cartridge 40. After the first rack 14 moves to a full extent, pins 14A projecting inwardly of the second rack 15 comes into engagement with the rear end portion of the first rack 14 so that the second rack 15 is pulled forward by the first rack 14, at which occurrence the second rack 15 comes into meshing engagement with the pinion 13 to be thereby driven to move forward as pushing the first rack 14 forward to a further extend by means of a coupling element 14B now moving into a position of coupling the first and second racks 14 and 15 longitudinally.

A clutch (not shown) is provided between the pinion 13 and the motor 11 for disengaging the driving connection therebetween when the trigger 3 is released. Thus, at the time of loading of the cartridge 40 through a front opening of the barrel 30, the first and second racks 14 and 15 can be manually retracted, or pushed back by the cartridge 40 being inserted as rotating the pinion 13 freely, during which movement the second rack 15 is initially moved back to its backward-most position as being pushed by the first rack 14 and thereafter the first rack 14 itself is slid back so as to be received within the length of the second rack 15. The above telescopic connection of the first and second racks 14 and 15 provides a maximum stroke of the plunger 10 while reducing the length of a rearward projection 8 required at the rear end of the housing 1 for receiving therein the rear end of the combination first and second racks 14 and 15.

A retaining spring 27 is secured interior of the rear end of the housing 1 to have its bifurcated hook ends 28 in engagement with respective rows of teeth formed on the second rack 15 in order to prevent it from accidentally moving forward at the initial forward movement of the first rack 14 as being dragged thereby due to the frictional force which may be developed between the first and second racks 14 and 15. However, the engaging force by the retaining spring 27 is rather small so that it can be readily forced out of engagement with the second rack 15 when the latter comes into meshing engagement with the pinion 13 to be driven forward. Movable together with the pinon 13 is an indicator plate 19 with colored spirals a portion of which is viewed through windows 21 of a nameplate 20 attached on the side of housing 1 for the purpose of indicating the relative amount of contents of the cartridge 40 remaining to be dispensed.

As shown in FIG. 3, said housing 1 is made of two side halves 1*a* secured together by screws to enclose said gear casing 12 and being provided at the front ends respectively with lips 22 which are combined to form an annular mouth 23 into which an annulus 17 at the forward end of said gear casing 12 is fitted and secured thereto by screws 24. Said annulus 17 is an integral part of an end member 18 which is integrally formed with casing 12 and through which the first and second racks 14 and 15 extend forwardly into the barrel 30.

Figure 7:
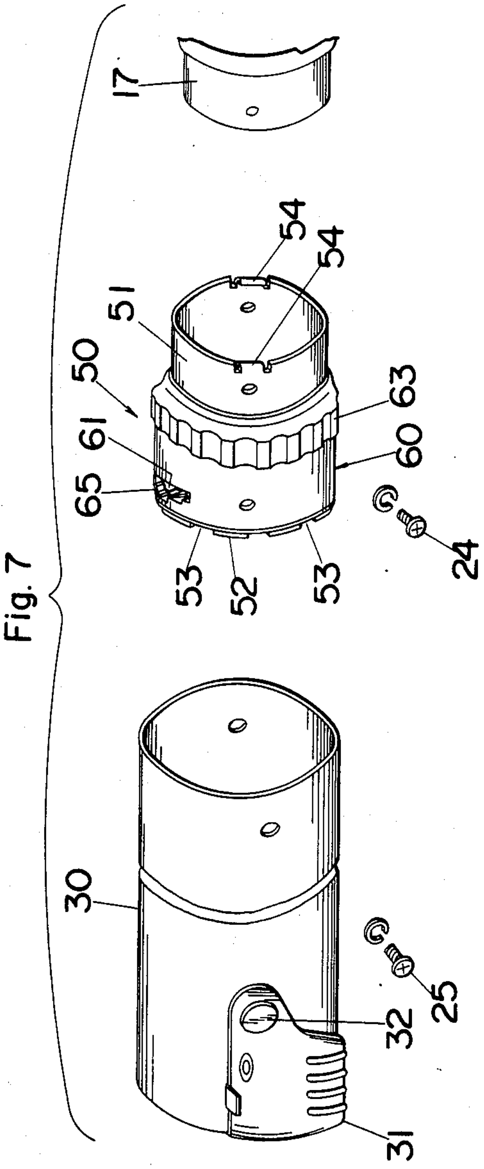
FIG. 7 is an exploded perspective view of the joint assembly and a portion of the gun to which it is connected.
Figure 6:
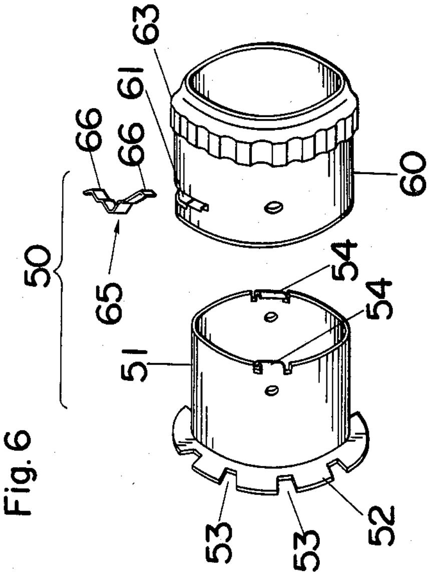
FIG. 6 is an exploded perspective view of a joint assembly employed in the gun.
Figure 9:
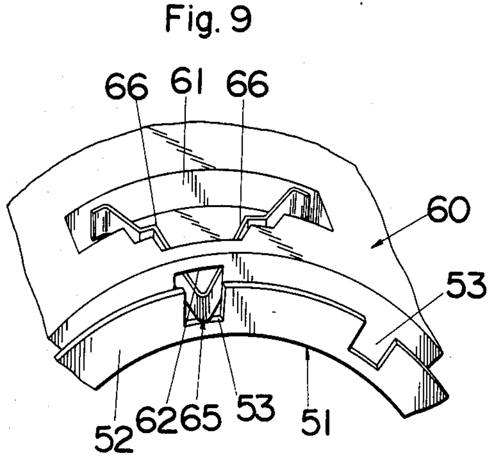
FIGS. 9 and 10 are enlarged perspective view of a portion of the joint assembly respectively for illustrating the same in its lock and release positions.
Figure 10:
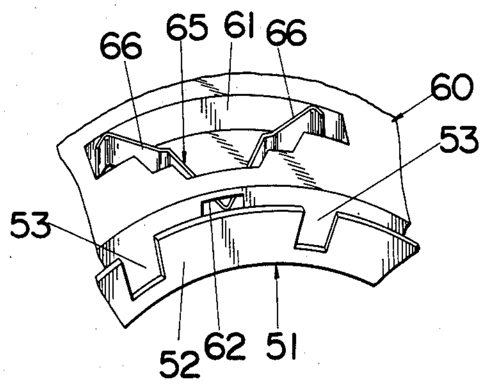
Figure 11:
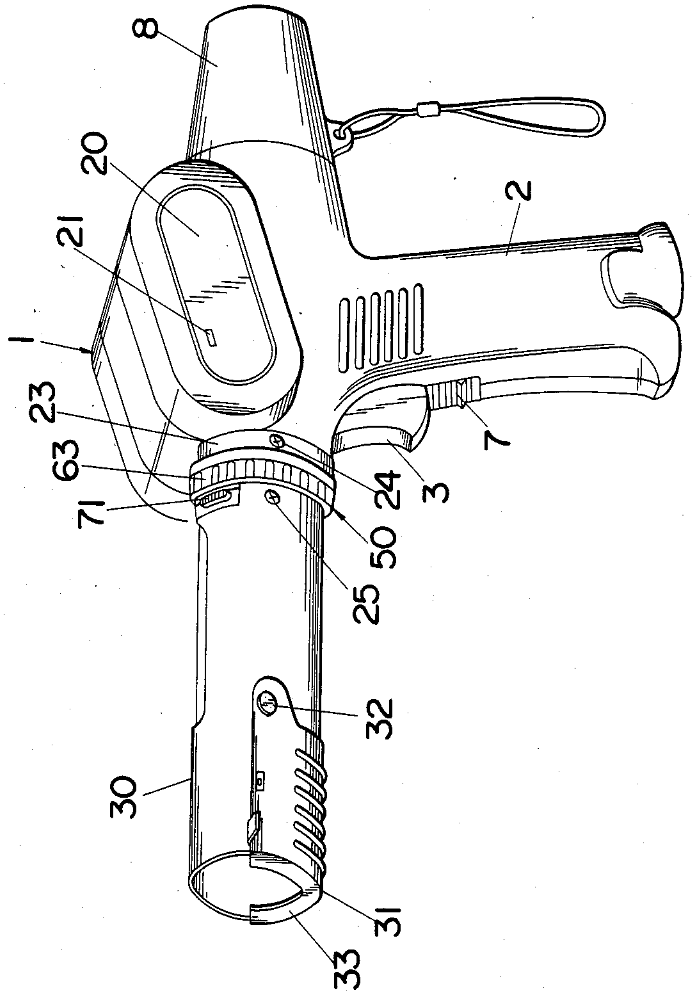
FIG. 11 is a perspective view of a dispensing gun in accordance with a second embodiment of the present invention.
Figure 14:
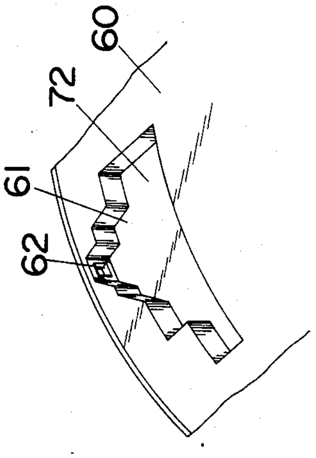
FIG. 14 is an enlarged perspective view of a portion of the joint assembly receiving a ratchet spring and a release knob.
Figure 12:
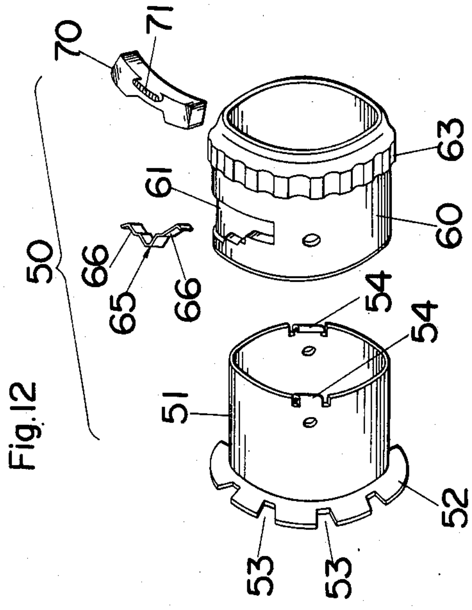
FIG. 12 is an exploded perspective view of a joint assembly employed in the gun of FIG. 11.
Figure 13:
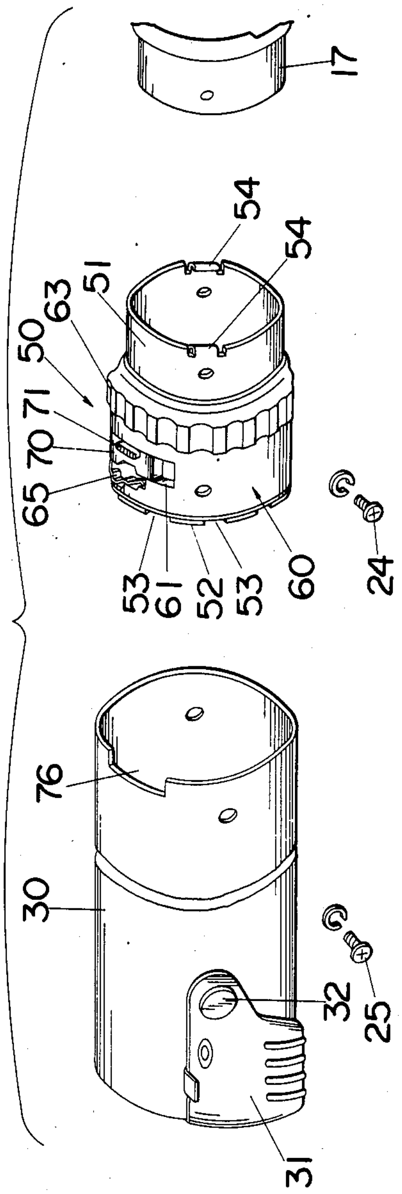
FIG. 13 is an exploded perspective view of the joint assembly and a portion of the gun to which it is connected.
Figure 15:
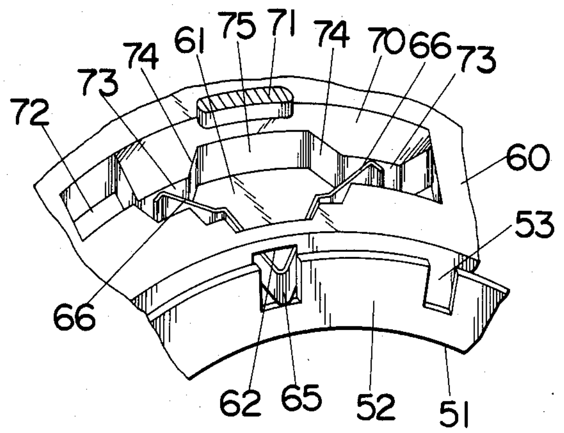
FIGS. 15 and 16 are enlarged perspective view of a portion of the joint assembly respectively for illustrating the same in its lock and release positions.
Figure 16:
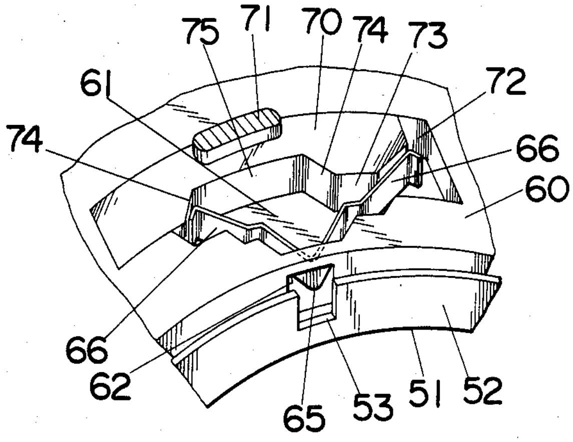

Referring to FIGS. 6 and 7, said joint assembly 50 rotatably connecting the barrel 30 to the housing 1 includes lock means for holding the barrel 30 at one of a plurality of angular positions about its axis. Said lock means comprises a sleeve pipe 51 and a handle ring 60 rotatably fitted thereon. The sleeve pipe 51 has its rear end inserted between said annulus 17 and the mouth 23 of the housing 1 to be fixedly secured thereto by means of said screw 24, and the handle ring 60 has its front end portion inserted in the end of said barrel 30 to be fixedly secured thereto by screws 25. A pair of lugs 54 struck from and formed integrally with the sleeve pipe 51 at its rear end are bent to overlie the outer periphery of the mouth 23 of the housing 1. An end flange 52 projects radially outwardly from the front end of the sleeve pipe 51 into abutting engagement with the front edge of the handle ring 60 for establishing the axial connection between the barrel 30 and the housing 1. The end flange 52 is formed with a plurality of circumferentially spaced notches 53 into one of which is selectively engaged a ratchet spring 65 to latch the barrel 30 fixing the sleeve pipe 51 in one of a plurality of different angular positions about its axis with respect to the housing 1 fixed to the handle ring 60. In this instance, the notches 53 are angularly spaced at an angle of 45° about the axis to provide eight angularly displaced positions at each of which the barrel 30 or the cartridge 40 can be kept latched. Said ratchet spring 65 is of generally V-shaped configuration with a pair of legs 66 and is seated within a circumferentially elongate slot 61 in the outer surface of the handle ring 60 immediately adjacent to the front edge thereof in such a manner that the tip of the ratchet spring 65 is received in an axial hole 62 communicating with the slot 61. The ratchet spring 65 is normally biased by its inherent resiliency to project its tip through the hole 62 into mating engagement with one of said notches 53 in the end flange 52 of the sleeve pipe 51, as shown in FIG. 9, so as to latch the barrel 30 in a desired angular position. As a result of the V-shaped configuration of the ratchet spring 65, it can be resiliently deformed by spreading and narrowing its legs 66. Thus, to alter the angular position of the barrel 30, the barrel 30 is rotated against the bias of the ratchet spring 65 until the latter comes into mating engagement with another notch 53, during which operation the tip of the spring 65 is firstly forced by the end flange 52 to be pushed back into the hole 62 by spreading the spring legs 66, as shown in FIG. 10 and then biased again into mating engagement with a selected notch 53 to be locked at this position. Consequently, the barrel 30 or the cartridge 40 held therein can be readily adjusted to an optimum angular disposition with respect to the housing 1 suitable for applying a bead of the viscous material dispensed out of the spout 42 as utilizing the angled edge 43 of the spout 42 as a spatula. That is, the gun can be moved around, for example, window and door frames, by suitably changing the angular orientation of the angled edge 43 of the spout 42 for effectively applying the bead to differing surfaces or joints while the housing 1 is kept at a comfortable position for manipulating the gun. The ratchet spring 65 and the major portion of the handle ring 60 including the slot 61 are hidden inside of the rear end of the barrel 30 so as to leave only the rear end portion of the handle ring 60 exposed, on which portion is integrally formed a knurled dial 63 for facilitating rotation of the barrel 30 together with the handle ring 60.

Referring to FIGS. 11 to 16, a dispensing gun according to a second embodiment of the present invention is shown which is similar in construction to the first embodiment except that release means is provided for forcibly disengaging the ratchet spring from the notches. Other structures are identical to those of first embodiment and therefore like numerals are employed to indicate like parts. Said release means is composed of a release knob 71 with a slider 70 slidably received in a groove 72 located rearwardly of said slot 61 which is in communicating relation therewith and extends circumferentially so that the release knob 71 or slider 70 is movable between a release position and a lock position. When the slider 70 is moved to the lock position of FIG. 15, the ratchet spring 65 has its legs 66 in pressing contact respectively with raised edges 73 of the slider 70 to be thereby resiliently urged forwardly, projecting its tip through the hole 62 into mating engagement with one of the notches 53 in the end flange 52 of the sleeve pipe 51 to latch the barrel 30 at a desired angular position. When the slider 70 is moved into the release position of FIG. 16, the ratchet spring 65 is urged by its inherent resiliency to move back into the slot 61 by sliding the ends of its legs 66 over inclined edges 74 into respective indentations 75 from said raised edge 73, thereby drawing the tip of the ratchet spring 65 away from the notch 53 of the end flange 52 for allowing the barrel 30 to be freely rotatable. Thus, adjusting the angular position of the barrel 30 can be easily performed by moving the release knob 71 to the release position and rotating the barrel 30 to a desired angular position, after which the knob 71 is moved back to its lock position where the ratchet spring 65 is again pressed forward as its legs 56 riding up the inclined edges 74 to the raised edges 73, locking the tip of the ratchet spring 65 into mating engagement with the selected notch 53 in the end flange 52 of the sleeve pipe 51. The ratchet spring 65, slot 61, and groove 72 are hidden inside of the rear end portion of the barrel 30 so as to only expose a knob 71 through a recess 76 at the rear end of the barrel 30. Thus, rotating of the barrel 30 can be done by manipulating the release knob 71 and the knurled dial 63. In this connection, since the knob 71 and the dial 63 are adjacently disposed on the handle ring 60 which is fixed to the barrel 30, the barrel 30 can be easily adjusted its angular position only by one hand of the operator while the gun is held by the other hand.

In this and previous embodiments, the ratchet spring 65 is provided on the side of the barrel 30 and the associated notches 53 are on the side of the housing 1, however, they may be provided in the reverse relation for effecting the same locking operation. Also, although the lock means in the above embodiments comprises a single ratchet spring and a plurality of associated notches, it is equally possible to provide a plurality of ratchet springs for mating engagement with one or a plurality of notches.

What is claimed is:

1. In a dispensing gun having a housing with a hand grip, a barrel extending from the housing, a cartridge mounted within the barrel and containing a supply of viscous material, drive means in the housing, a plunger driven by the drive means to push a piston forming the rear wall of the cartridge for dispensing the contents thereof from a spout at the forward end of the cartridge, the improvement comprising:

a joint assembly for coaxially connecting the barrel with the housing so that the barrel is rotatable about its axis with respect to the housing, said cartridge being received in the barrel to be rotatable together therewith, said joint assembly including a sleeve pipe and a handle ring unrotatably secured respectively to the housing and the barrel, the handle ring being rotatably fitted around the sleeve pipe and being formed in its periphery with a slot for receiving a ratchet spring, and said ratchet spring being biased to project axially beyond the end face of the handle ring so as to be into mating engagement with one of a plurality of circumferentially spaced notches formed in an annular end flange of the sleeve pipe abutting against the end face of the handle ring.

2. In a dispensing gun having a housing with a hand grip, a barrel connected to the housing, a cartridge mounted within the barrel and containing a supply of viscous material, drive means in the housing, a plunger driven by the drive means to push a piston forming the rear wall of the cartridge for dispensing the contents thereof from a spout at the forward end of the cartridge, the improvement comprising:

a joint assembly for coaxially connecting the barrel with the housing so that the barrel is rotatable about its axis with respect to the housing, said cartridge being received in the barrel to be rotatable together therewith, said joint assembly including a sleeve pipe and a handle ring unrotatably secured respectively to the housing and the barrel, the handle ring being rotatably fitted around the sleeve pipe and being formed in its periphery with a slot for receiving a ratchet spring, said ratchet spring being biased to project axially beyond the end face of the handle ring so as to be into mating engagement with one of a plurality of circumferentially spaced notches formed in an annular end flange of the sleeve pipe abutting against the end face of the handle ring, said handle ring further including a release knob which is received in a circumferential groove behind the slot to be movable between a lock position of biasing the ratchet spring into mating engagement with the notch and a release position of allowing the ratchet spring to be retarded in the direction of being disengaged from the notch.

* * * * *